Patented Mar. 20, 1923.

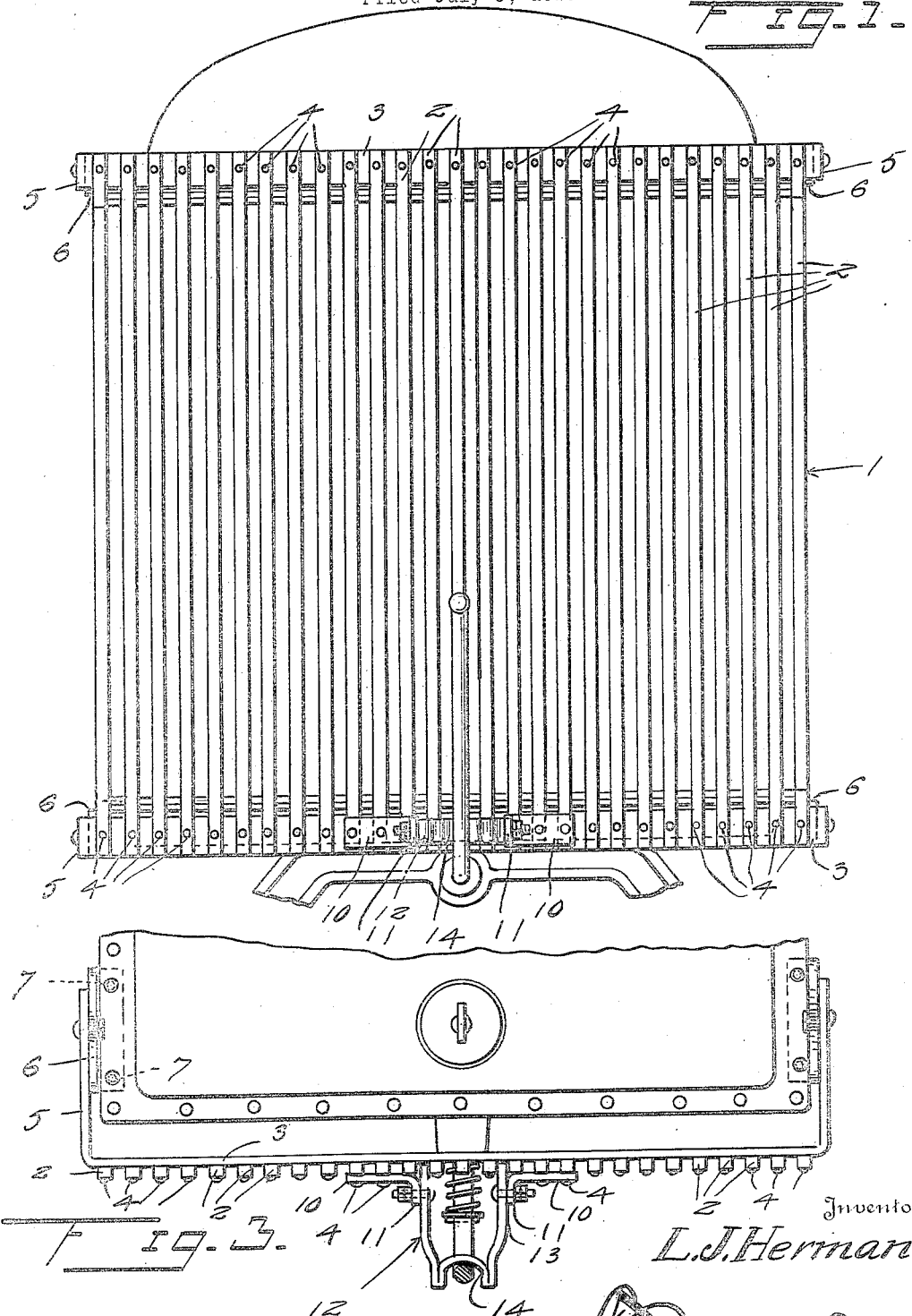

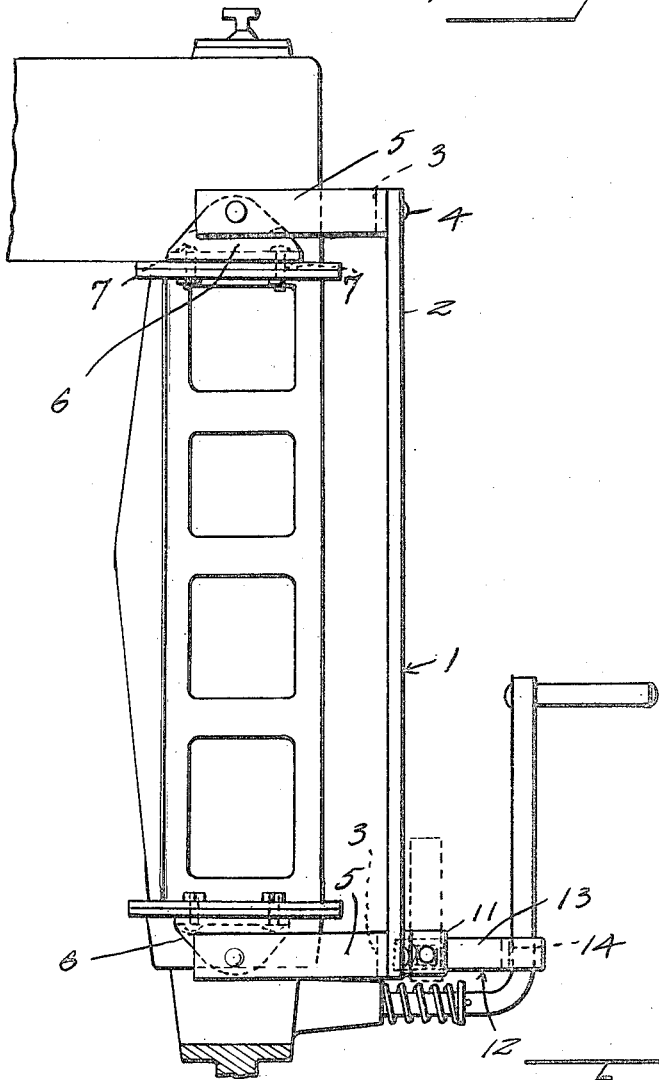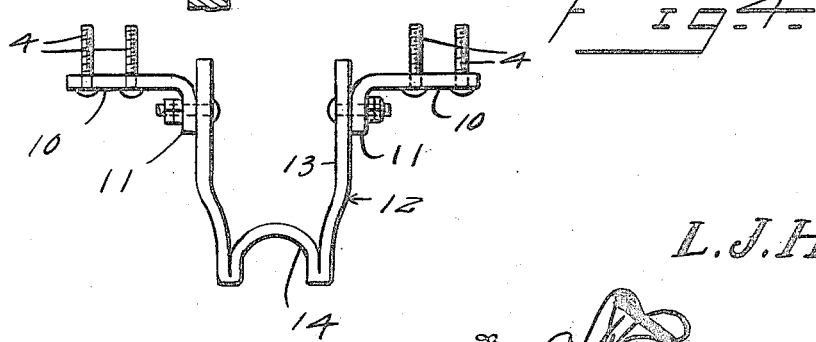

1,449,322

UNITED STATES PATENT OFFICE.

LOUIE J. HERMANN, OF SIGOURNEY, IOWA.

RADIATOR PROTECTOR.

Application filed July 5, 1921. Serial No. 482,510.

*To all whom it may concern:*

Be it known that I, LOUIE J. HERMANN, a citizen of the United States, residing at Sigourney, in the county of Keokuk, and State of Iowa, have invented certain new and useful Improvements in Radiator Protectors; and I do hereby declare the following to be a full, clear, and exact description of the invention, such as will enable others skilled in the art to which it appertains to make and use the same.

This invention relates to new and useful improvements in radiator protectors or guards and has for its primary object the provision of means for protecting the core or fragile portions of a radiator used on a tractor or motor vehicle against injury.

Another object of this invention is the provision of means on the protector or guard for supporting the starting crank of the tractor or motor vehicle to prevent trash and other foreign matter from catching thereon and being dragged along by the tractor or motor vehicle.

Another object of this invention is the provision of a protector or guard of the above stated character which will be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which:—

Figure 1 is a front elevation illustrating a protector or guard applied to the radiator of a tractor, Figure 2 is a side elevation illustrating the same, Figure 3 is a top plan view illustrating the protector, Figure 4 is a detail view illustrating an attaching bracket.

Referring in detail to the drawings, the numeral 1 indicates as an entirety a protector or guard adapted to be arranged in front and supported by the radiator of a tractor commercially known as the Fordson and is adapted to protect the core or fragile portion of the radiator against injury. The protector or guard 1 consists of a plurality of relatively spaced bars 2 constructed of heavy gauge material and have their ends connected to horizontally disposed supporting bars 3 by means of fasteners 4. The bars 3 have formed upon their ends rearwardly extending arms 5 to which angle iron brackets 6 are bolted. The brackets 6 are also provided with openings 7 to receive the bolts 8 of the radiator 9 whereby the guard is firmly attached to the radiator and disposed in front of the latter so as to protect the fragile part or core thereof.

A pair of plates 10 are secured to the lowermost bar 3 by the fasteners which secure the rods or members 2 thereto and have their adjacent ends offset to form attaching ears 11 to which a crank holder 12 is pivoted. The crank holder 12 is of substantially U-shape having its arm portions 13 pivoted to the ears 11 while its web or bight portion is arcuately curved to form a seat 14 for the crank handle 15 of the tractor. When the holder 12 is swung in a position to extend parallel with the bars 2 of the guard or protector, the holder is then out of the path of rotation of the starting crank. After the motor has been started of the tractor, the crank is lifted into a vertical position and the holder 12 is swung at right angles so that the crank is received within the seat 14 and prevented from falling or rotating to a downward position. With the crank in an upright position, it is prevented from coming in contact with trash and other foreign matter on the ground.

While I have shown and described the preferred embodiment of my invention, it will be understood that minor changes in construction, combination, and arrangement of parts may be made without departing from the spirit and scope of the invention as claimed.

Having thus described my invention what I claim is:

1. A radiator protector comprising upper and lower longitudinal members having their terminals bent into parallelism, spaced bars, means detachably connecting the ends of said bars to said members, upstanding and depending attaching ears connected respectively with the upper and lower portions of the radiator, and means fastening the bent terminals of said longitudinal members to the said ears.

2. A radiator protector comprising upper and lower longitudinal members having their terminals bent into parallelism, spaced bars, means connected to the ends of said bars to said members, upstanding and depending attaching ears, each of said ears having an attaching base portion, means attaching said ears respectively to the upper and lower portions of a radiator, and means fastening the bent terminals of said longitudinal members to said ears, said bent terminals providing means whereby to space said bars from said radiator.

In testimony whereof I affix my signature in presence of two witnesses.

LOUIE J. HERMANN.

Witnesses:
B. D. HELSCHER,
H. O. HIESCHER.